(12) United States Patent
Paden

(10) Patent No.: US 9,099,090 B2
(45) Date of Patent: Aug. 4, 2015

(54) TIMELY SPEECH RECOGNITION

(71) Applicant: Canyon IP Holdings LLC, Wilmington, DE (US)

(72) Inventor: Scott Edward Paden, Matthews, NC (US)

(73) Assignee: Canyon IP Holdings, LLC, Wilmington, DE (US)

( * ) Notice: Subject to any disclaimer, the term of this patent is extended or adjusted under 35 U.S.C. 154(b) by 299 days.

(21) Appl. No.: 13/632,962

(22) Filed: Oct. 1, 2012

(65) Prior Publication Data

US 2013/0275129 A1 Oct. 17, 2013

Related U.S. Application Data

(63) Continuation of application No. 12/546,636, filed on Aug. 24, 2009, now Pat. No. 8,301,454.

(60) Provisional application No. 61/091,330, filed on Aug. 22, 2008.

(51) Int. Cl.
*G10L 15/26* (2006.01)
*G10L 15/22* (2006.01)

(52) U.S. Cl.
CPC ............... *G10L 15/26* (2013.01); *G10L 15/22* (2013.01)

(58) Field of Classification Search
CPC ......... G10L 15/00; G10L 15/04; G10L 15/08; G10L 15/22; G10L 15/24; G10L 15/26; G10L 2015/00; G10L 2015/08; G10L 2015/22; G10L 2015/221225; G10L 2015/226
USPC ............. 704/235, 231, 251, 255, 270, 270.1, 704/275
See application file for complete search history.

(56) References Cited

U.S. PATENT DOCUMENTS 5,675,507 A 10/1997 Bobo, II
6,173,259 B1 1/2001 Bijl et al.
(Continued)

FOREIGN PATENT DOCUMENTS

EP 1274222 A2 1/2003
WO WO 2006101528 A1 9/2006

OTHER PUBLICATIONS

David H. Kemsley, et al. A Survey of Neural Network Research and Fielded Applications, 1992, in International Journal of Neural Networks: Research and Applications, vol. 2, No. 2/3/4, pp. 123-133. Accessed on Oct. 25, 2007 at https://citeseer.ist.psu.edu/cache/papers/cs/25638/ftp:zSzzSzaxon.cs.byu. eduzSzpubzSzpaperszSzkemsley_92.pdf/kemsley92survey.pdf, 12 pages total.

(Continued)

*Primary Examiner* — Qi Han
(74) *Attorney, Agent, or Firm* — Knobbe Martens Olson & Bear LLP

(57) ABSTRACT

An automatic speech recognition engine may generate text or tokens that correspond to audio data. For example, the automatic speech recognition engine may generate first text or first speech tokens corresponding to a first portion of audio data. The automatic speech recognition engine may further generate second text or second speech tokens that correspond to a first portion of the audio data and a second portion of the audio data. The text or speech tokens generated by the automatic speech recognition engine may be provided to a device for presentation thereon. In some embodiments, the automatic speech recognition engine generates the second text or second speech tokens substantially while the first text or first speech tokens are presented on the device.

18 Claims, 15 Drawing Sheets

(56) References Cited

U.S. PATENT DOCUMENTS

| | | | |
|---|---|---|---|
| 6,219,638 B1 | 4/2001 | Padmanabhan et al. | |
| 6,490,561 B1 | 12/2002 | Wilson et al. | |
| 6,532,446 B1 | 3/2003 | King | |
| 6,654,448 B1 | 11/2003 | Agraharam et al. | |
| 6,687,339 B2 | 2/2004 | Martin | |
| 6,687,689 B1 | 2/2004 | Fung et al. | |
| 6,760,699 B1 * | 7/2004 | Weerackody et al. | 704/233 |
| 6,760,700 B2 | 7/2004 | Lewis et al. | |
| 6,775,360 B2 | 8/2004 | Davidson et al. | |
| 6,816,578 B1 | 11/2004 | Kredo et al. | |
| 6,820,055 B2 | 11/2004 | Saindon et al. | |
| 6,895,084 B1 | 5/2005 | Saylor et al. | |
| 7,200,555 B1 | 4/2007 | Ballard et al. | |
| 7,206,932 B1 | 4/2007 | Kirchhoff | |
| 7,225,224 B2 | 5/2007 | Nakamura | |
| 7,233,655 B2 | 6/2007 | Gailey et al. | |
| 7,236,580 B1 | 6/2007 | Sarkar et al. | |
| 7,254,384 B2 | 8/2007 | Gailey et al. | |
| 7,302,280 B2 | 11/2007 | Hinckley et al. | |
| 7,640,158 B2 | 12/2009 | Detlef et al. | |
| 7,689,415 B1 | 3/2010 | Jochumson | |
| 7,729,912 B1 | 6/2010 | Bacchiani et al. | |
| 7,890,586 B1 | 2/2011 | McNamara et al. | |
| 7,899,670 B1 | 3/2011 | Young et al. | |
| 7,899,671 B2 | 3/2011 | Cooper et al. | |
| 8,027,836 B2 | 9/2011 | Baker et al. | |
| 2003/0008661 A1 | 1/2003 | Joyce et al. | |
| 2003/0050778 A1 | 3/2003 | Nguyen et al. | |
| 2003/0126216 A1 | 7/2003 | Avila et al. | |
| 2003/0220798 A1 | 11/2003 | Schmid et al. | |
| 2004/0005877 A1 | 1/2004 | Vaananen | |
| 2004/0015547 A1 | 1/2004 | Griffin et al. | |
| 2004/0151358 A1 | 8/2004 | Yanagita et al. | |
| 2005/0010641 A1 | 1/2005 | Staack | |
| 2005/0021344 A1 | 1/2005 | Davis et al. | |
| 2005/0080786 A1 | 4/2005 | Fish et al. | |
| 2005/0101355 A1 | 5/2005 | Hon et al. | |
| 2005/0197145 A1 | 9/2005 | Chae et al. | |
| 2005/0283364 A1 * | 12/2005 | Longe et al. | 704/257 |
| 2005/0288926 A1 | 12/2005 | Benco et al. | |
| 2006/0052127 A1 | 3/2006 | Wolter | |
| 2007/0115845 A1 | 5/2007 | Hochwarth et al. | |
| 2007/0180718 A1 | 8/2007 | Fourquin et al. | |
| 2007/0239837 A1 | 10/2007 | Jablokov et al. | |
| 2007/0255794 A1 | 11/2007 | Coutts | |
| 2008/0077406 A1 | 3/2008 | Ganong | |
| 2008/0195588 A1 | 8/2008 | Kim et al. | |
| 2008/0243500 A1 | 10/2008 | Bisani et al. | |
| 2008/0261564 A1 | 10/2008 | Logan | |
| 2008/0275864 A1 | 11/2008 | Kim et al. | |
| 2008/0275873 A1 | 11/2008 | Bosarge et al. | |
| 2009/0055175 A1 | 2/2009 | Terrell, II et al. | |
| 2009/0076917 A1 | 3/2009 | Jablokov et al. | |
| 2009/0083032 A1 | 3/2009 | Jablokov et al. | |
| 2009/0124272 A1 | 5/2009 | White et al. | |
| 2009/0163187 A1 | 6/2009 | Terrell, II | |
| 2009/0182560 A1 | 7/2009 | White | |
| 2009/0228274 A1 | 9/2009 | Terrell, II et al. | |
| 2009/0240488 A1 | 9/2009 | White et al. | |
| 2009/0248415 A1 | 10/2009 | Jablokov et al. | |
| 2009/0276215 A1 | 11/2009 | Hager | |
| 2010/0049525 A1 | 2/2010 | Paden | |
| 2010/0058200 A1 | 3/2010 | Jablokov et al. | |
| 2010/0180202 A1 | 7/2010 | Del Valle Lopez | |

OTHER PUBLICATIONS

Desilets, A., Bruijn, B., Martin, J., 2002, Extracting keyphrases from spoken audio documents, Springer-Verlag Berlin Heidelberg, 15 pages.

Fielding, et al., Hypertext Transfer Protocol-HTTP/ 1.1, RFC 2616, Network Working Group (Jun. 1999), sections 7,9.5, 14.30, 12 pages total.

Glaser et al., Web-based Telephony Bridges for the Deaf, Proc. South African Telecommunications Networks & Applications Conference (2001), Wild Coast Sun, South Africa, 5 pages total.

Transl8it! Translation engine, publicly available on http://www.transl8it.com since May 30, 2002. Retrieved on Oct. 26, 2007, 6 pages total.

vBulletin Community Forum, thread posted on Mar. 5, 2004. Page retrieved on Oct. 26, 2007 from http://www.vbulletin.com/forum/showthread.php?t=96976, 1 page total.

J2EE Application Overview, publicly available on http://www/orionserver.com/docs/j2eeoverview.html since Mar. 1, 2001. Retrieved on Oct. 26, 2007, 3 pages total.

Lewis et al., SoftBridge: An Architecture for Building IP-based Bridges over the Digital Divide. Proc. South African Telecommunications Networks & Applications Conference (SATNAC 2002), Drakensberg, South Africa, 5 pages total.

"International Search Report" and "Written Opinion of the International Search Authority" (Korean Intellectual Property Office) in Yap, Inc. International Patent Application Serial No. PCT/US2007/008621, dated Nov. 13, 2007, 13 pages total.

Marshall, James, HTTP Made Really Easy, Aug. 15, 1997, retrieved from http://www.jmarshall.com/easy/http/ on Jul. 25, 2008, 15 pages total.

Knudsen, Jonathan, Session Handling in MIDP, Jan. 2002, retrieved from http://developers.sun.com/mobility/midp/articles/sessions on Jul. 25, 2008, 7 pages total.

* cited by examiner

| Confidence Level | Emoticon |
|---|---|
| 0%-39% | :-( |
| 40%-59% | :-\| |
| 60%-100% | :-) |

*FIG. 6A*

| Confidence Level | Emoticon |
|---|---|
| 0%-64% | :-( |
| 65%-75% | :-\| |
| 76%-100% | :-) |

*FIG. 6B*

```
POST /Yap/Login HTTP/1.1
Host: www.icynine.com:8080
User-Agent:  Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

*FIG. 10*

Login/Login HEADER

| Request Headers | Request Body | Response Body |
|---|---|---|
| User-Agent | N/A | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 11*

Yap/Login HEADER

| Request Headers | Request Body | Response Body |
|---|---|---|
| User-Agent | N/A | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 12*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (opt) | | |
| Yap-Return-Cells | | |
| Yap-Return-TTS | | |
| Yap-Content-Type | | |
| Yap-Content-Length | | |

Binary Data Field

*FIG. 13*

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

*FIG. 14*

Returns: an XML Hierarchy containing

- result—the body of result xml
- result-type
- result-code
- result-code-description
- result-text
- result-is-silence
- result-details
- result-conf
- lattice

*FIG. 15*

TTS HEADER

| Request Headers | Request Body | Response Body |
|---|---|---|
| User-Agent | N/A | TTS Binary Audio Data |
| Content-Language | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 16*

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 17*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

FIG. 18

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

FIG. 19

TIMELY SPEECH RECOGNITION

I. INCORPORATION BY REFERENCE

This application is a continuation of U.S. patent application Ser. No. 12/546,636, titled "METHODS, APPARATUSES, AND SYSTEMS FOR PROVIDING TIMELY USER CUES PERTAINING TO SPEECH RECOGNITION," filed on Aug. 24, 2009, which issued as U.S. Pat. No. 8,301,454 on Oct. 30, 2012. U.S. patent application Ser. No. 12/546,636 is a nonprovisional application of and claims the benefit of U.S. Provisional Patent Application No. 61/091,330, titled "METHODS, APPARATUSES, AND SYSTEMS FOR PROVIDING TIMELY USER CUES PERTAINING TO SPEECH RECOGNITION," filed on Aug. 22, 2008. The disclosures of both of these applications are hereby incorporated by reference in their entireties.

Additionally, U.S. nonprovisional patent application Ser. No. 11/697,074, filed Apr. 5, 2007 and published as U.S. Patent Application Publication No. US 2007/0239837, is incorporated herein by reference, and each of the following patent applications, and any corresponding patent application publications thereof, are incorporated herein by reference:

(1) U.S. nonprovisional patent application Ser. No. 12/197,213, filed Aug. 22, 2008 and titled "CONTINUOUS SPEECH TRANSCRIPTION PERFORMANCE INDICATION;"
(2) U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES;"
(3) U.S. nonprovisional patent application Ser. No. 12/198,112, filed Aug. 25, 2008 and titled "FILTERING TRANSCRIPTIONS OF UTTERANCES;"
(4) U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF;"
(5) U.S. nonprovisional patent application Ser. No. 12/212,644, filed Sep. 17, 2008 and titled "METHODS AND SYSTEMS FOR DYNAMICALLY UPDATING WEB SERVICE PROFILE INFORMATION BY PARSING TRANSCRIBED MESSAGE STRINGS;"
(6) U.S. nonprovisional patent application Ser. No. 12/212,645, filed Sep. 17, 2008 and titled "FACILITATING PRESENTATION OF ADS RELATING TO WORDS OF A MESSAGE;"
(7) U.S. nonprovisional patent application Ser. No. 12/344,313, filed Dec. 26, 2008 and titled "VALIDATION OF MOBILE ADVERTISING FROM DERIVED INFORMATION;"
(8) U.S. nonprovisional patent application Ser. No. 12/355,319, filed Jan. 16, 2009 and titled "USING A PHYSICAL PHENOMENON DETECTOR TO CONTROL OPERATION OF A SPEECH RECOGNITION ENGINE;"
(9) U.S. nonprovisional patent application Ser. No. 12/400,723, filed Mar. 9, 2009 and titled "USE OF INTERMEDIATE SPEECH TRANSCRIPTION RESULTS IN EDITING FINAL SPEECH TRANSCRIPTION RESULTS;"
(10) U.S. nonprovisional patent application Ser. No. 12/407,502, filed Mar. 19, 2009 and titled "CORRECTIVE FEEDBACK LOOP FOR AUTOMATED SPEECH RECOGNITION;" and
(11) U.S. nonprovisional patent application Ser. No. 12/415,874, filed Mar. 31, 2009 and titled "USE OF METADATA TO POST PROCESS SPEECH RECOGNITION OUTPUT."

Finally, the disclosure of provisional application 60/789,837 is contained in Appendix A, attached hereto and, likewise, are incorporated herein in its entirety by reference and is intended to provide background and technical information with regard to the systems and environments of the inventions of the current patent application. Similarly, the disclosure of the brochure of Appendix B is incorporated herein in its entirety by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. BACKGROUND OF THE PRESENT INVENTION

While listening to spoken words, a human listener often indicates his quality of understanding through visual and other cues. If the speaker is human and is in the presence of the listener, the speaker often recognizes these cues and adjusts one or more aspects of her speech patterns accordingly, such as by speaking louder or softer, using better diction, speaking more slowly, emphasizing certain words, or the like. By making such adjustments, the speaker hopes to improve the listener's quality of speech recognition, thus improving his overall understanding of what the speaker is saying.

In recent years, however, email, text messaging and other technologies have become more pervasive, often replacing oral conversations. Such technologies do not provide the recipient with the sorts of cues described above. However, because, traditionally, the person sending the email, text message or the like has the ability to review the written (typed) message before transmitting it, the person is able to control the content as desired.

More recently, however, Automatic Speech Recognition ("ASR") systems have found application with regard to text messaging, which until recently involved the input of a text message by a sender who presses letters and/or numbers associated with the sender's mobile phone. As recognized for example in the aforementioned, commonly-assigned U.S. patent application Ser. No. 11/697,074, it can be advantageous to make text messaging far easier for an end user by allowing the user to dictate his or her message rather than requiring the user to type it into his or her phone. In certain circumstances, such as when a user is driving a vehicle, typing a text message may not be possible and/or convenient, and may even be unsafe. However, text messages can be advantageous to a message receiver as compared to voicemail, as the receiver actually sees the message content in a written format rather than having to rely on an auditory signal.

Unfortunately, in at least some ASR systems, inaccurate transcriptions are commonplace. Thus, in systems in which text messages are sent directly to the recipient without review by the sender, inaccurate transcriptions can create considerable communication errors, often without the sender being aware of such problems. Moreover, even if senders have the ability to review their messages before sending them, they may choose not to do so.

Although methodologies have been developed to provide feedback to the user (transmitter), today's technologies provide feedback to the user based only on audio signal quality. That is, the cues to the user are based on information from the audio capture device. More particularly, user cues are based on measurement of the audio signal. Furthermore, even where existing methodologies provide feedback, in the form of confidence levels determined by the system, such feedback is reported only after the fact, i.e., after a complete utterance has been converted to text. The user cannot use such information to adjust the quality of his speech until he begins a subsequent utterance.

Thus, a need exists for a system that uses an ASR engine to transcribe a user's utterance for subsequent transmission to one or more recipients as a text message or the like, but which also provides the user with cues, in a timely fashion, that mimic one or more of those typically provided as feedback by a listener when in the presence of a speaker, thereby permitting the user to adjust the quality of his speech within the same utterance.

IV. SUMMARY OF THE INVENTION

Just as a human listener can indicate quality of understanding through visual and other cues to a human speaker, so can a recognition device indicate quality of recognition through a variety of cues targeted at the user. Such cues can improve recognition, thereby helping the user change his or her behavior and thus improving overall understanding of the user's speech. This invention describes a methodology that interactively routes ASR quality feedback from the ASR engine to the user in a timely fashion while the user is speaking, thereby allowing the user to adjust his or her behavior or environment resulting in improved speech recognition.

This invention differs from existing methodologies at least in that in accordance with this invention, user cues can be based, at least in part, on a level of understanding from the ASR engine. Such user cues can be based on confidence or other ASR engine statistics rather than being based solely on audio based metrics such as signal quality.

It is believed that recognition may be improved by indicating to a user the quality of on-going speech recognition at that moment. This methodology would route ASR quality feedback from the ASR engine to the user while the user is speaking (i.e., during the ASR process as opposed to after the ASR process completes), thus allowing the user to adjust his or her behavior or environment and thereby resulting in improved speech recognition.

This methodology differs from existing feedback mechanisms where the audio capture device uses measurement of the audio signal as a source for user cues. This methodology sends cues from the ASR engine. Such cues are based on semantics, biometrics, or other ASR engine statistics rather than signal quality. It's possible also to base the user cues on a combination of metrics, such metrics including but not limited to an audio signal, a device status, a position, and other similar metrics.

This methodology takes advantage of the "on-the-fly" streaming of voice data and speech recognition where the stream of audio data is being recognized by the ASR engine while the user is yet speaking. Since the ASR engine is already in the process of doing ASR it can interactively stream feedback data and provide cues to the user during the speech acquisition process rather than after the user's utterance is complete.

The nature of the data flowing from the ASR engine and the nature of the cues to the user may vary based one or more of a variety of factors. For example, this invention could find application in the context of a client/server model such as a cell phone on a network. Application could further be made for local ASR devices where ASR occurs in the device, such as a PC or GPS in a car. Further, the nature of user cues may be verbal, auditory (such as beeping noises), graphical (such as an emoticon), vibration, lights, or other cues. The nature of the feedback data may vary as well. For example the data may be streamed or sent in the form of HTTP protocol or messages over a GSM control channel.

The present invention includes many aspects and features. Moreover, while many aspects and features relate to, and are described in, the context of interactive user cues, the present invention is not limited to use only in interactive user cues, as will become apparent from the following summaries and detailed descriptions of aspects, features, and one or more embodiments of the present invention.

Accordingly, one aspect of the present invention relates to a method of providing interactive user cues pertaining to speech recognition. The method includes receiving data representing a portion of an utterance of a user; converting said data representing said portion of said utterance to transcribed text; determining a metric of said transcribed text; and causing an indication of said metric to be provided to said user before said user has concluded said utterance.

In a feature of this aspect of the invention, said metric is a confidence level.

In a feature of this aspect of the invention, said indication of said metric is a visual indication.

In a feature of this aspect of the invention, said indication of said metric is a tactile indication.

In a feature of this aspect of the invention, said indication of said metric is an auditory indication.

In a feature of this aspect of the invention, said indication of said metric is an emoticon.

In a feature of this aspect of the invention, said indication of said metric is a haptic indication.

In a feature of this aspect of the invention, said indication of said metric is a vibrational indication.

In a feature of this aspect of the invention, said indication of said metric is optical.

In a feature of this aspect of the invention, said indication of said metric is graphical.

In a feature of this aspect of the invention, said metric is a biometric.

In a feature of this aspect of the invention, said metric is an ASR engine statistic.

A second aspect of the present invention relates to a method of providing interactive user cues pertaining to speech recognition. The method includes listening with a microphone to an utterance of a user; transmitting data representing said utterance to a server; receiving data representing a metric of text transcribed from said utterance; and providing to said user an indication of said metric before said user has concluded said utterance.

In a feature of this aspect of the invention, said metric is a biometric.

In a feature of this aspect of the invention, said metric is a confidence level.

In a feature of this aspect of the invention, said metric is an ASR engine statistic.

In a feature of this aspect of the invention, said indication of said metric is a visual indication.

In a feature of this aspect of the invention, said indication of said metric is a tactile indication.

In a feature of this aspect of the invention, said indication of said metric is an auditory indication.

In a feature of this aspect of the invention, said indication of said metric is an emoticon.

In a feature of this aspect of the invention, said indication of said metric is a haptic indication.

In a feature of this aspect of the invention, said indication of said metric is a vibrational indication.

In a feature of this aspect of the invention, said indication of said metric is optical.

In a feature of this aspect of the invention, said indication of said metric is graphical.

A third aspect of the present invention relates to a method of providing cues from a device to a user while capturing an utterance. The method includes: capturing, by a hand-held mobile communication device, a first portion of an utterance of a user; communicating, from the hand-held mobile communication device to a backend server, data representative of the first portion of the user utterance; receiving, at the backend server, the data representative of the first portion of the user utterance; processing, at the backend server, the data representative of the first portion of the user utterance, said processing including determining, at the backend server, a metric associated with the first portion of the user utterance; communicating, from the backend server to the hand-held mobile communication device, data representative of the metric associated with the first portion of the user utterance; at the hand-held mobile communication device, receiving, from the backend server, the data representative of the metric associated with the first portion of the user utterance; providing, by the hand-held mobile communication device to the user, a cue based on the received data representative of a metric associated with the first portion of the user utterance; capturing, by the hand-held mobile communication device, a second portion of the utterance of the user; communicating, from the hand-held mobile communication device to the backend server, data representative of the second portion of the user utterance; receiving, at the backend server, the data representative of the second portion of the user utterance; processing, at the backend server, the data representative of the second portion of the user utterance, said processing including determining, at the backend server, a metric associated with the second portion of the user utterance; communicating, from the backend server to the hand-held mobile communication device, data representative of the metric associated with the second portion of the user utterance; at the hand-held mobile communication device, receiving, from the backend server, the data representative of the metric associated with the second portion of the user utterance; and providing, by the hand-held mobile communication device to the user, a cue based on the received data representative of the metric associated with the second portion of the user utterance; wherein said step of providing, by the hand-held mobile communication device to the user, a cue based on the received data representative of a metric associated with the first portion of the user utterance, occurs prior to said step of capturing, by the hand-held mobile communication device, a second portion of the user utterance.

In a feature of this aspect, the method further includes: capturing, by the hand-held mobile communication device, a third portion of the user utterance; communicating, from the hand-held mobile communication device to the backend server, data representative of the third portion of the user utterance; receiving, at the backend server, the data representative of the third portion of the user utterance; processing, at the backend server, the data representative of the third portion of the user utterance, said processing including determining, at the backend server, a metric associated with the third portion of the user utterance; communicating, from the backend server to the hand-held mobile communication device, data representative of the metric associated with the third portion of the user utterance; at the hand-held mobile communication device, receiving, from the backend server, the data representative of the metric associated with the third portion of the user utterance; and providing, by the hand-held mobile communication device to the user, a cue based on the received data representative of the metric associated with the third portion of the user utterance; wherein said step of providing, by the hand-held mobile communication device to the user, a cue based on the received data representative of a metric associated with the second portion of the user utterance, occurs prior to said step of capturing, by the hand-held mobile communication device, a third portion of the user utterance.

A fourth aspect of the present invention relates to a method of providing cues to a user while capturing an utterance. The method includes capturing, by an electronic communication device, an utterance of a user. The method further includes providing, by the electronic communication device to the user in at least near real-time, a plurality of cues associated with the user utterance, wherein such providing step includes, for each portion of a plurality of portions of the utterance: communicating, from the electronic communication device, data representative of the respective portion of the user utterance to a remote electronic device; in response to the communication of data representative of the respective portion of the user utterance, receiving, at the electronic communication device, data representative of at least one parameter associated with the respective portion of the user utterance; and providing, by the electronic communication device to the user, one or more cues based on the at least one parameter associated with the respective portion of the user utterance. Also in the method, at least one cue of the plurality of cues is provided by the electronic communication device to the user prior to completion of the step of capturing the user utterance.

In a feature of this aspect, said step of communicating, from the electronic communication device, data representative of each respective portion of the user utterance comprises streaming, from the electronic communication device, data representative of the utterance.

In another feature of this aspect, said step of receiving, at the electronic communication device, data representative of at least one parameter associated with the respective portion of the user utterance comprises receiving, at the electronic communication device, a token comprising data representative of at least one parameter associated with the respective portion of the user utterance.

In another feature of this aspect, each respective portion consists of a word, each respective portion consists of a syllable, each respective portion consists of a phrase, or each respective portion consists of a sentence.

In another feature of this aspect, each respective portion comprises a word, each respective portion comprises a syllable, each respective portion comprises a phrase, or each respective portion comprises a sentence.

In another feature of this aspect, the at least one parameter associated with each respective portion of the user utterance comprises at least one metric associated with each respective portion of the utterance.

In another feature of this aspect, the at least one parameter associated with each respective portion of the user utterance comprises a confidence level corresponding to a transcription result of the respective portion of the utterance.

In another feature of this aspect, the method further includes receiving, for each respective portion of the plurality of portions, at the electronic communication device, together with the data representative of at the least one parameter associated with the respective portion of the utterance of the user, data representative of a transcription result of the respective portion of the utterance of the user.

In another feature of this aspect, the at least one parameter associated with each respective portion of the user utterance comprises a volume level of the utterance or a background noise level of the utterance.

In another feature of this aspect, said step of providing, by the electronic communication device to the user, one or more cues, comprises displaying, via the electronic communication device, a graphical cue. In a further feature, the graphical cue comprises an emoticon.

In another feature of this aspect, said step of providing, by the electronic communication device to the user, one or more cues, comprises outputting, via the electronic communication device, an auditory cue, verbal cue, or optical cue.

In another feature of this aspect, said step of providing, by the electronic communication device to the user, one or more cues, comprises providing, by the electronic communication device to the user, a plurality of cues, each cue being based on a different parameter associated with the respective portion of the user utterance.

In another feature of this aspect, said step of providing, by the electronic communication device to the user, one or more cues, comprises providing, by the electronic communication device to the user, a combination cue based on a plurality of parameters associated with the respective portion of the user utterance. In a further feature, the combination cue is configured to be perceivable as representative at least two different parameters associated with the respective portion of the utterance of the user.

In another feature of this aspect, the method further includes adjusting, by the user, his or her speech pattern based on a provided cue.

A fifth aspect of the present invention relates to a method of facilitating the provision of cues to a user while capturing an utterance of the user, comprising, for each respective portion of a plurality of portions of an utterance of a user captured by a hand-held mobile communication device. The method includes: receiving, at a backend server, data representative of the respective portion of the captured user utterance; transcribing the respective portion of the user utterance into text at the backend server; determining, at the backend server, a parameter corresponding to the respective portion of the user utterance or corresponding to the text into which the respective portion was transcribed; and communicating, from the backend server to the hand-held mobile communication device, the parameter corresponding to the respective portion of the user utterance or corresponding to the text into which the respective portion was transcribed; wherein said step of communicating, from the backend server to the hand-held mobile communication device, the parameter corresponding to a first respective portion of the utterance or corresponding to the text into which the first respective portion was transcribed occurs prior to receiving, at the backend server, data representative of a second respective portion of the user utterance.

In a feature of this aspect, the method further includes, for each portion of the plurality of portions, communicating, from the backend server to the hand-held mobile communication device, data representative of the text into which the respective portion was transcribed together with the communicated parameter.

In addition to the aforementioned aspects and features of the present invention, it should be noted that the present invention further encompasses the various possible combinations and subcombinations of such aspects and features.

V. BRIEF DESCRIPTION OF THE DRAWINGS

Further aspects, features, embodiments, and advantages of the present invention will become apparent from the following detailed description with reference to the drawings, wherein:

FIG. 6A is a tabular illustration of a first exemplary series of confidence level ranges and emoticons corresponding thereto;

FIG. 6B is a tabular illustration of a second exemplary series of confidence level ranges and emoticons corresponding thereto;

FIG. 10 is a typical header section of an HTTP request from the client in the commercial implementation;

FIG. 11 illustrates exemplary protocol details for a request for a location of a login server and a subsequent response;

FIG. 12 illustrates exemplary protocol details for a login request and a subsequent response;

FIG. 13 illustrates exemplary protocol details for a submit request and a subsequent response;

FIG. 14 illustrates exemplary protocol details for a results request and a subsequent response;

FIG. 15 illustrates exemplary protocol details for an XML hierarchy returned in response to a results request;

FIG. 16 illustrates exemplary protocol details for a text to speech request and a subsequent response;

FIG. 17 illustrates exemplary protocol details for a correct request;

FIG. 18 illustrates exemplary protocol details for a ping request; and

FIG. 19 illustrates exemplary protocol details for a debug request.

VI. DETAILED DESCRIPTION OF THE PREFERRED EMBODIMENTS

Figure 1:
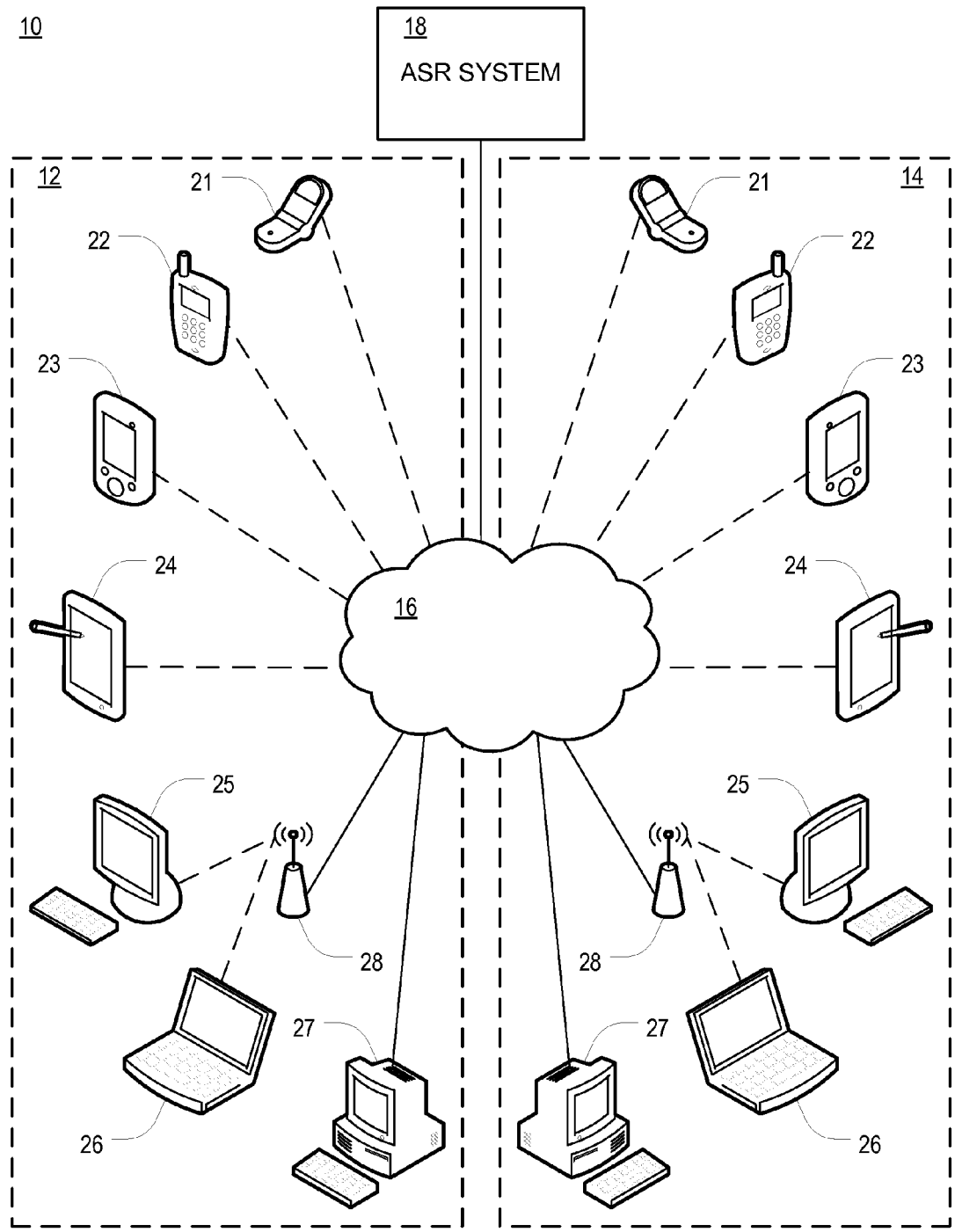
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an automatic speech recognition ("ASR") system 18, including an ASR engine. Transmitting and receiving devices 12,14 may include cell phones 21, smart phones 22, PDAs 23, tablet notebooks 24, various desktop and laptop computers 25,26,27, and the like, one or more of which may be a handheld device. At least some of the handheld devices are capable of communications using both voice and data channels, either separately or simultaneously, and in at least some embodiments, in parallel. One or more of the devices 12,14, such as the illustrated iMac and laptop computers 25,26, may connect to the network systems 16 via a wireless access point 28. The various transmitting and receiving devices 12,14 (one or both types of which being sometimes referred to herein as "client devices") may be of any conventional design and manufacture.

Figure 2:
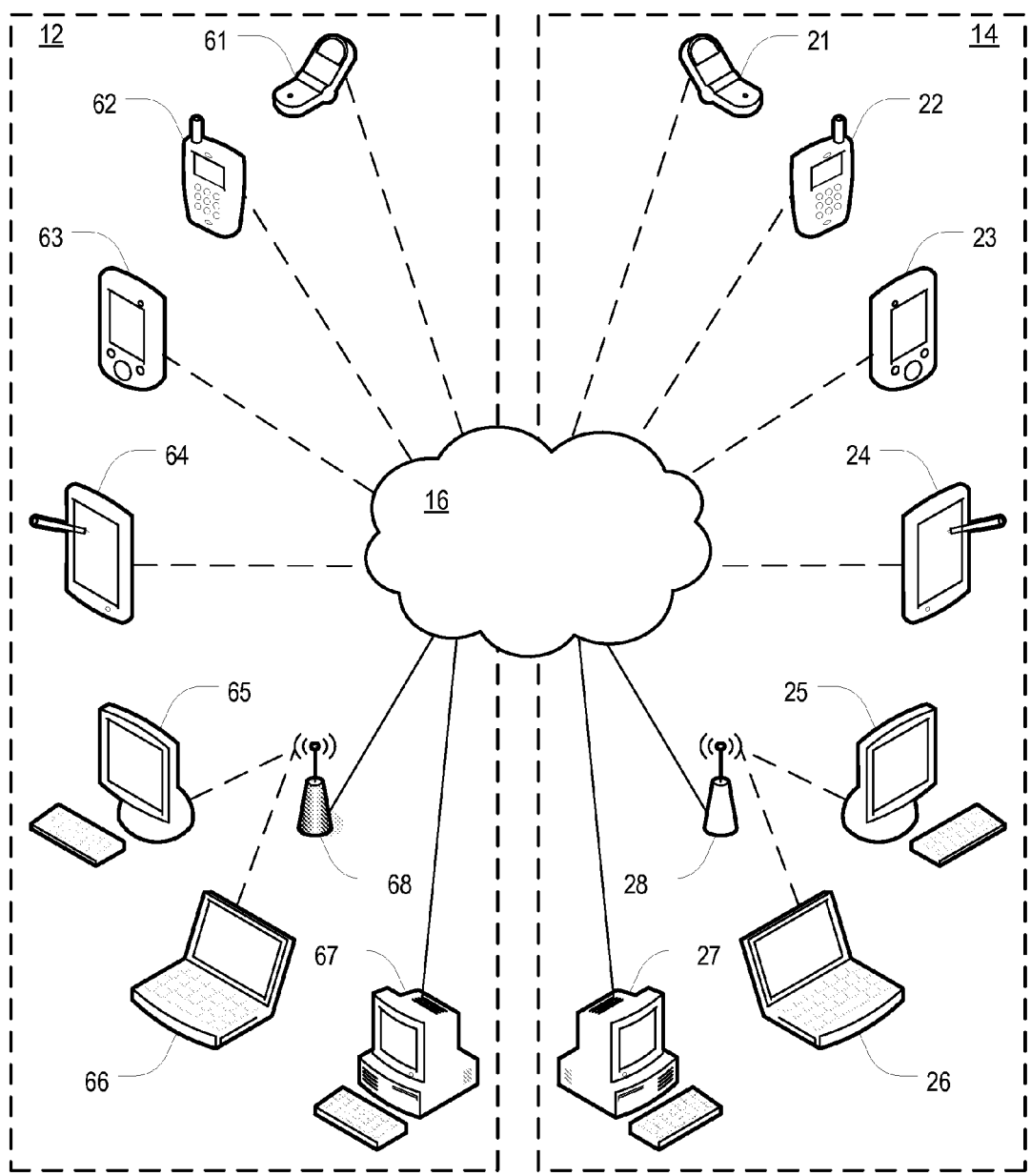
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

More particularly, and as described, for example, in the aforementioned U.S. Patent Application Pub. No. US 2007/0239837, FIG. 3 may be understood to be a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating under joint or independent control) and the internet 150. The backend server 160 is or may be placed in communication with the mobile phone 12 via the mobile communication service provider 140 and the internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. Such communications (V1, T4, V/T1) to and from the mobile phone 12 are preferably carried out using a data channel, rather than a voice channel, of the mobile phone 12. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiments, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance 36, thus generating an audio message, V1. At this stage, the audio message V1 is recorded in the mobile phone 12. By releasing the button, the recorded audio message V1 is sent to the backend server 160 through the mobile communication service provider 140.

Figure 3:
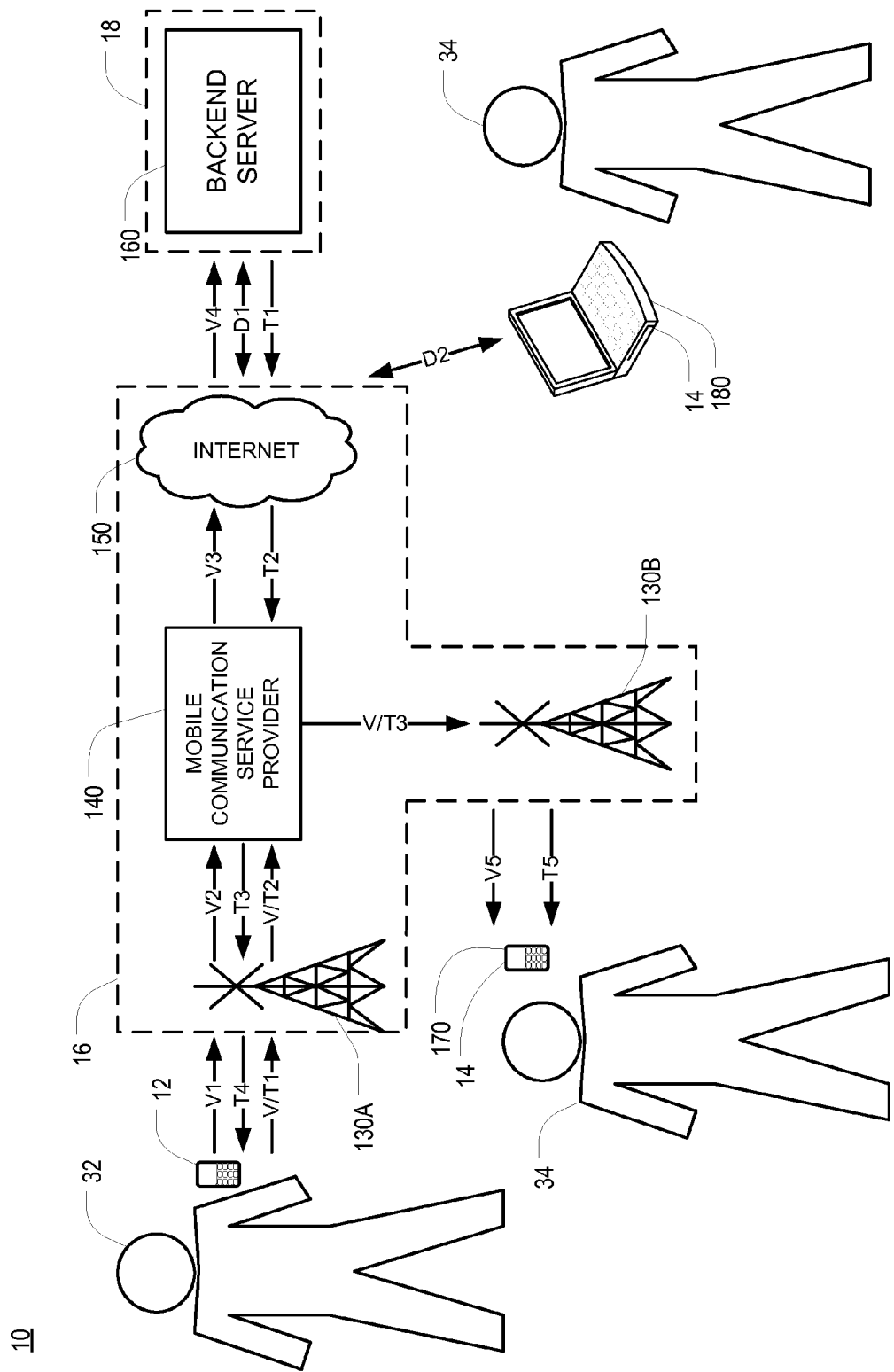
FIG. 3 is a block diagram of an exemplary implementation of the system of FIG. 1.

In the exemplary embodiment of the present invention as shown in FIG. 3, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the internet 150. The internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the internet 150 that outputs them into a text message T2 and a digital signal D2, respectively.

The digital signal D2 is transmitted to a digital receiver 180, generally defined as a receiving device 14 equipped to communicate with the internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system 10 may be utilized to convert an audio message into a text message. In at least one implementation, this may be accomplished by first initializing a transmitting device so that the transmitting device is capable of communicating with a backend server 160. Second, a user 32 speaks to or into the client device 12 so as to create a stream of an audio message. As the user 32 speaks, the streamed audio message is simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Additionally, in at least one implementation, the user may also have the option be able to alternatively cause the complete audio message to be recorded and then subsequently transmitted to the backend server 160 (i.e., without streaming).

Furthermore, in at least one implementation, advertising messages and/or icons may be displayed on one or both types of client device 12,14 according to keywords contained in the converted text message, wherein the keywords are associated with the advertising messages and/or icons.

Still further, in at least one implementation, one or both types of client device 12,14 may be located through a global positioning system (GPS); and listing locations, proximate to the position of the client device 12,14, of a target of interest may be presented in the converted text message.

Figure 4:
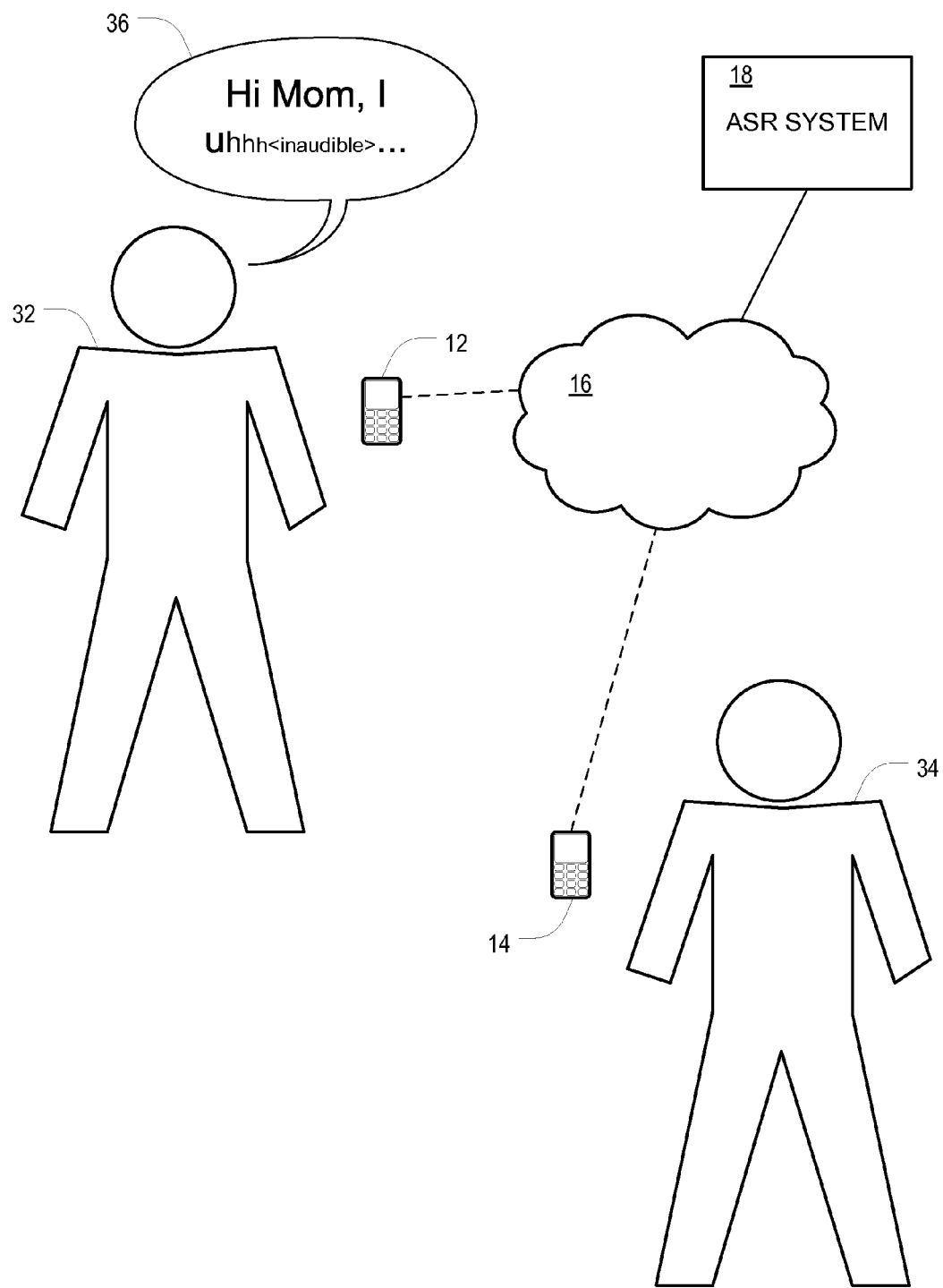
FIG. 4 is a schematic diagram illustrating the operation of continuous speech transcription performance indication in conjunction with a portion of the communication system of FIGS. 1 and 3.

FIG. 4 is a block diagram illustrating communications between two users 32,34 via a portion of the communication system 10 of FIGS. 1 and 3. As shown therein, a first user 32, sometimes referred to herein as a "transmitting user," is communicating with a second user 34, sometimes referred to herein as a "receiving user," by way of respective transmitting and receiving devices 12,14. More particularly, the transmitting user 32 uses his transmitting device 12 to initiate text messages that are transmitted to, and received by, the receiving user 34 via her receiving device 14. In the context of text messaging, the transmitting user 32 may send text messages using his transmitting device 12, for example via SMS, and the receiving user 34 receives text messages on his receiving device 14, in this case also via SMS. In the context of instant messaging, the transmitting user 32 may send instant messages via an IM client using his transmitting device 12, and particularly using a data channel of the transmitting device 12, and the receiving user 34 receives instant messages on his receiving device 14, via an IM client, particularly using a data channel of the receiving device 14.

In either case, the transmitting user 32 preferably speaks into his transmitting device 12 with his utterances being converted to text for communicating to the receiving device 14, all as more fully described herein. More particularly, the first user 32 speaks an utterance 36 into the transmitting device 12, and the recorded speech audio is sent to the ASR system 18, preferably using a data channel of the device 12, as described previously. In the example of FIG. 4, the utterance 36 is "Hi Mom, I uhhh," with the utterance then trailing off and becoming inaudible, although speech is ongoing and sound is still being captured. The ASR engine in the ASR system 18 attempts to recognize and transcribe the utterance 36 into text. Speech recognition requests received by the ASR engine may be handled, for example, according to processes described elsewhere herein and, in particular, in FIG. 3, and accompanying text, of the aforementioned U.S. Patent Application Pub. No. US 2007/0239837. Further, speech recognition may be carried out, for example, according to processes described elsewhere herein and, in particular, in FIGS. 6A-6H, and accompanying text, of the aforementioned U.S. Patent Application Pub. No. US 2007/0239837.

It will be appreciated that automated transcription of recorded utterances 36 is useful in other environments and applications as well. For example, in another system (not separately illustrated), a user speaks an utterance 36 into a device as a voicemail, and the recorded speech audio is sent to the ASR system 18. Other applications to which the teachings of the present invention are applicable will be apparent to the Ordinary Artisan.

Assuming the audio message is being simultaneously transmitted (streamed) to the backend server 160 for processing, the ASR engine is able to carry out its conversion process almost immediately. Furthermore, as part of this process, the ASR engine or another element of the backend server 160 is able calculate a confidence level. Further information regarding this process is described in commonly-assigned U.S. patent application Ser. No. 12/197,213, filed Aug. 22, 2008 and entitled "CONTINUOUS SPEECH TRANSCRIPTION PERFORMANCE INDICATION." Also as described therein, other parameters, including but not limited to volume and background noise, are likewise determined or gathered simultaneously as well.

As the parameters are calculated, they may be provided as an output in real time, or near-real time, to a user. More particularly, they may be logically associated with the transcribed text on a word-by-word basis, a syllable-by-syllable basis, a phrase-by-phrase basis, a sentence-by-sentence basis, or the like and returned to the user immediately thereafter. Furthermore, the confidence level or other parameters may be conveyed to the user in any of a variety of ways, as further described below.

Figure 5:
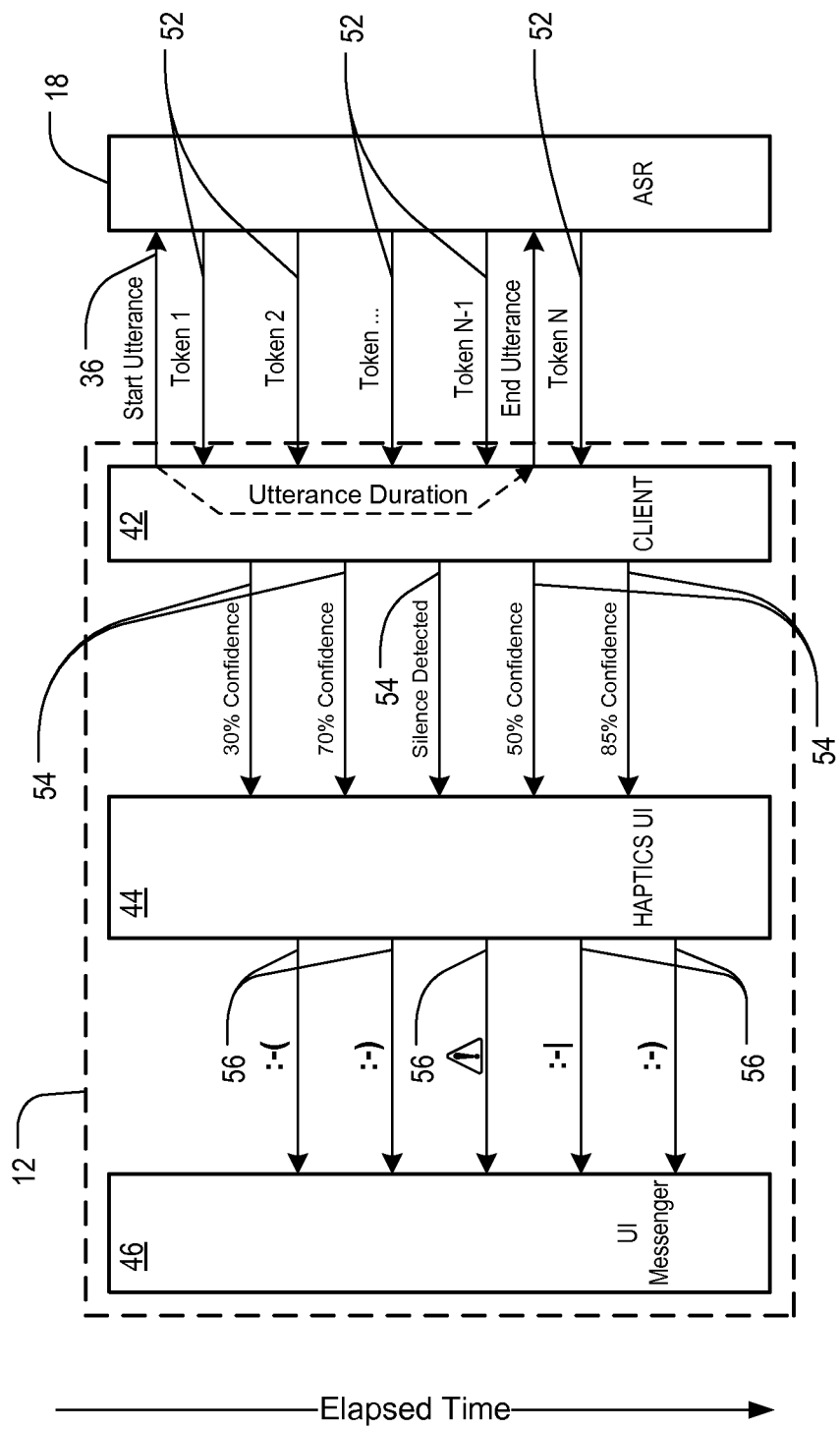
FIG. 5 is a sequence diagram illustrating how feedback data is communicated back to the user in an ASR system.

FIG. 5 is a exemplary sequence diagram illustrating the interaction between the ASR system 18 and the transmitting device 12. As shown therein, the interaction begins with a beginning of a streamed utterance 36 being transmitted from the device 12 to the ASR system 18. As the ASR engine in the ASR system 18 processes the utterance 36, it returns tokens 52 semi-regularly to the device 12 according to a predetermined basis (word-by-word, a syllable-by-syllable, a phrase-by-phrase, a sentence-by-sentence, or the like). The client 42 on the device 12 receives each token 52 and extracts, derives or determines one or more particular parameters therefrom. In the illustrated example, the particular parameter is the confidence level, calculated or determined by the ASR engine, for the transcription results that were reached. In some embodiments, both the parameters and the corresponding transcription element are returned, while in other embodiments, only the parameters are returned. In at least one embodiment, the user is provided with the ability to select whether transcription results are returned with the parameters or not.

As the parameters are extracted, derived or determined by the client 42, they are passed to another portion of the device software, which in at least one embodiment is a haptics user interface ("haptics UI") component 44. This software element preferably controls one or more other user interface elements 46 to provide the user 32 with one or more indications of the parameter or parameters being used to cue the user 32. In the illustrated example, the haptics UI 44 controls a display unit, as a UI messenger 46, to display an emoticon 56 whose appearance/selection may be understood, preferably intuitively, by the user 32 as corresponding to a particular confidence level value or range. FIGS. 6A and 6B are tabular illustrations of two exemplary series of confidence level ranges and the emoticons corresponding thereto, with the second series currently being preferred. Alternatively or additionally, however, the user cues may be verbal, auditory (such as beeping noises), graphical (of which the emoticons are an example), vibratory, optical (such as lights), or the like. Although certain types of cues may be more useful than others, the type of cue is not critical. It is more important that the cues be provided in real time or near-real time in order to accomplish the purposes herein.

The described process continues until the end of the utterance 36, with each token 52 being passed back to the device 12 and interpreted and utilized to provide the user 12 with an appropriate cue as to the quality of the transcription process. As these cues are perceived and understood by the user 12, preferably intuitively, the user 12 is believed to be better able to adjust his speech pattern accordingly in an attempt to improve the quality of the transcription.

Although not specifically illustrated, it will be appreciated that the user 12 may be simultaneously provided with cues representative of more than one parameter. Such cues may be separately presented and perceived, or may be unified but perceivable as representative of separate parameters.

It will be appreciated that the nature of the feedback data streaming from the ASR engine to the user client software 42 may vary without departing from the scope of the present invention. This data may be tokens 52 streamed to a user client 42 through a variety of means. The token stream may take various forms to accommodate for optimization or different communication paths. For example, the data may be compressed, encrypted or clear. The data may be sent via HTTP protocol, through SMS messages to the user's phone, through c++ style calls, or through remote procedure calls. The data itself may be tokens derived from confidence scores, biometrics, silence detection, or other algorithms or heuristics. Such feedback may be mixed with other current state of the art information such as signal quality.

It will also be appreciated that the nature of the communication path may vary. For example, the data may be communicated through socket interfaces, http interfaces, through circuit switched interfaces, or through GSM control channels. It may be possible to send SMS messages to the client application on a cell phone while the client uses HTTP to stream voice data to the ASR. In other situations it may be possible to store feedback data on in a shared memory queue between the ASR and the client. Fundamentally, sharing such feedback is part of this invention regardless of the format of the data or the way the data is sent to the client software.

Figure 7A:
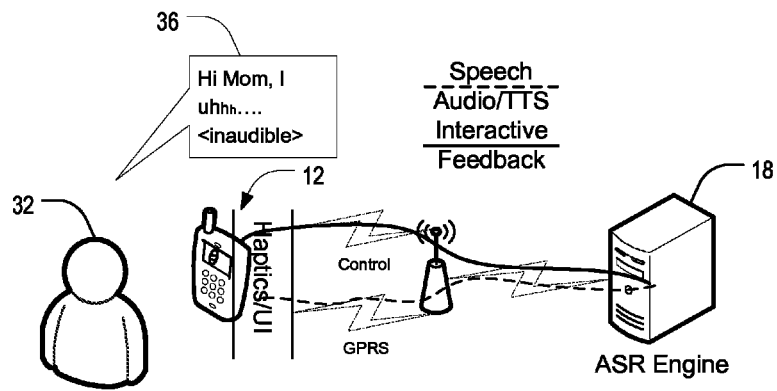
FIG. 7A is a schematic diagram illustrating a first particular implementation of the methodology of the present invention.
Figure 7B:
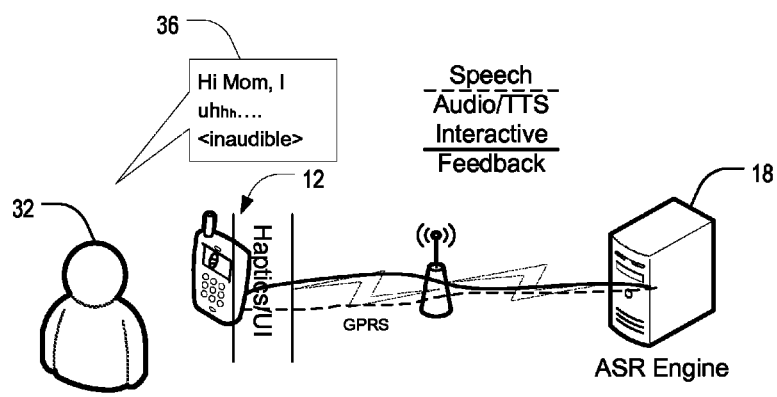
FIG. 7B is a schematic diagram illustrating a second particular implementation of the methodology of the present invention.

FIG. 7A is a schematic diagram illustrating a first particular implementation of the methodology of the present invention. In particular, as described previously, the utterance 36 begins to trail off, causing a poor quality transcription. As a result, using the exemplary process illustrated in FIG. 5 and described in accompanying text, the haptics UI interactively presents an emoticon in real-time to the user via the device 12. In this example, the ASR is part of a GSM network where feedback data is communicated via a control channel to the handset. A possible disadvantage of such an implementation is that it would require modification of the protocol stack and portions of the cellular infrastructure, thereby requiring significant cooperation with a carrier or use of a base station simulator. As a result, it may be more advantageous for the feedback data to be communicated over the IP interface via GPRS. FIG. 7B is a schematic diagram illustrating the latter implementation of the methodology of the present invention.

Commercial Implementation

One commercial implementation of the foregoing principles utilizes the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 8:
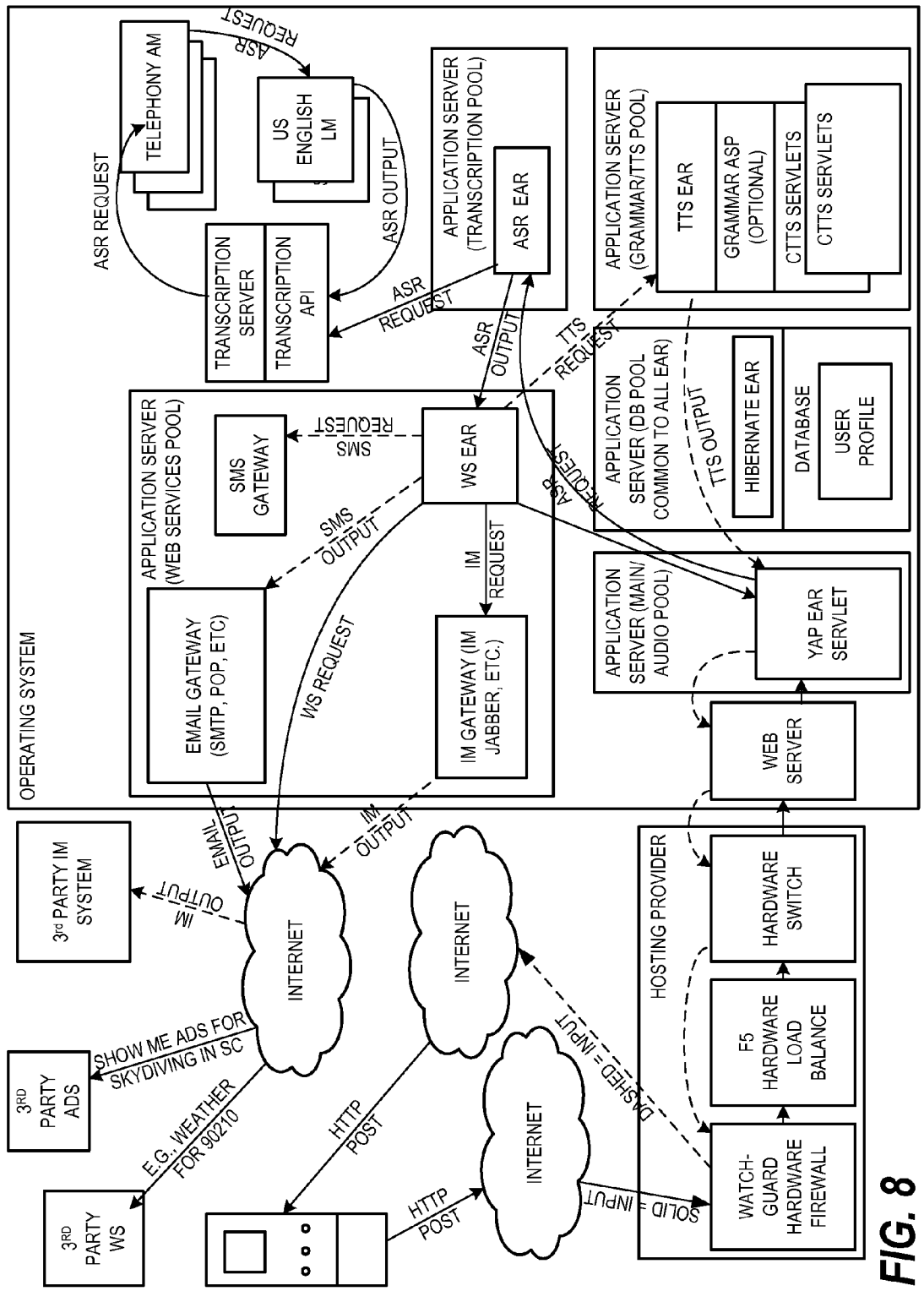
FIG. 8 is a block diagram of the system architecture of one commercial implementation.

FIG. 8 is a block diagram of the system architecture of the Yap commercial implementation. With reference to FIG. 8, the operating system may be implemented in Red Hat Enterprise Linux 5 (RHEL 5); the application servers may include the WebSphere Application Server Community Edition (WAS-CE) servers, available from IBM; the web server may be an Apache server; the CTTS Servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 9:
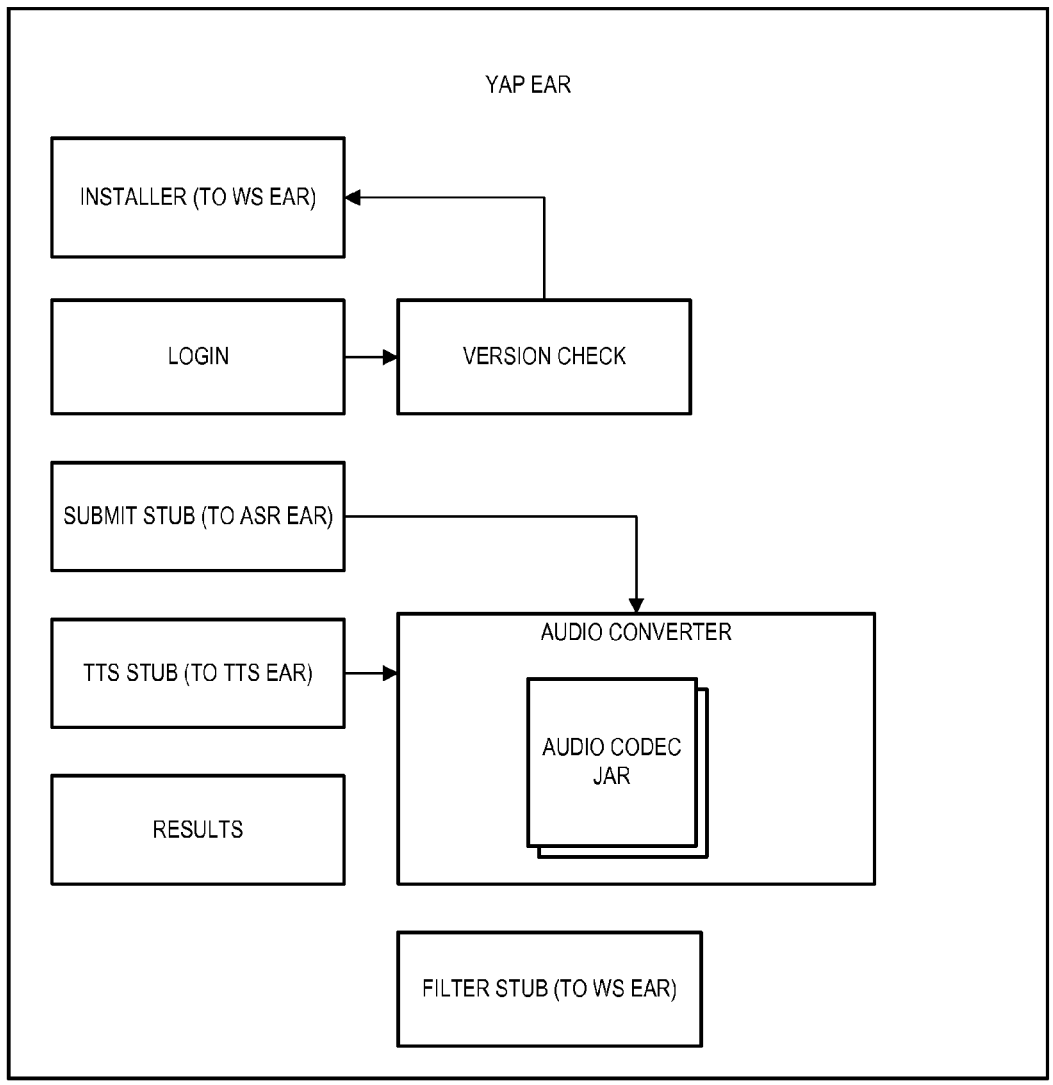
FIG. 9 is a block diagram of a portion of FIG. 8.

FIG. 9 is a block diagram of the Yap EAR of FIG. 8. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 10 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 9A-9D, and accompanying text, of the aforementioned U.S. Patent Application Pub. No. US 2007/0239837.

Usage Process—Install:

Installation of the Yap client device application is described in the aforementioned U.S. Patent Application Pub. No. US 2007/0239837 in a subsection titled "Install Process" of a section titled "System Architecture."

Usage Process—Notify:

When a Yap client is installed, the install fails, or the install is canceled by the user, the Notify servlet is sent a message by the phone with a short description. This can be used for tracking purposes and to help diagnose any install problems.

Usage Process—Login:

When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 11. An HTTP string pointing to a selected login server will be returned in response to this request. It will be appreciated that this selection process functions as a poor man's load balancer.

After receiving this response, a login request is sent. Exemplary protocol details for such a request can be seen in FIG. 12. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;
jsessionid=C240B217F2351E3C420A599B0878371A

Usage Process—Submit:

After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 13.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 3.

TABLE 3

| Filter Type | Function |
| --- | --- |
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" –> "$120.00") |
| Date Filter | Used to format dates returned from the speech engine into the user's preferred format. (e.g., "march fourth two thousand seven" –> "3/4/2007") |

TABLE 3-continued

| Filter Type | Function |
| --- | --- |
| Digit Filter | User to format spelled out single digits returned from the speech engine into a multi-digit number such as a zip code (e.g., "two eight two one one" –> "28211") |
| Engine Filter | Used to remove speech engine words |
| Number Filter | Used to convert the spelled out numbers returned from the speech engine into a digit based number (e.g., "one hundred forty seven" –> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" –> "don't 4get 2 :)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results:

The client retrieves the results of the audio by taking the receipt returned from the Submit servlet and submitting it as a request to the Results servlet. Exemplary protocol details for such a request can be seen in FIG. 14. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 15. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS:

The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 16. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct:

As a means of tracking accuracy and improving future SMS based language models, if the user makes a correction to transcribed text on the phone via the key elements of the key input unit 74 before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 17.

Usage Process—Ping:

Typically, web sessions will timeout after a certain amount of inactivity. The Ping servlet can be used to send a quick message from the client to keep the session alive. Exemplary protocol details for such a message can be seen in FIG. 18.

Usage Process—Debug:

Used mainly for development purposes, the Debug servlet sends logging messages from the client to a debug log on the server. Exemplary protocol details can be seen in FIG. 19.

Usage Process—Logout:

To logout from the Yap server, an HTTP logout request needs to be issued to the server. An exemplary such request would take the form: "/Yap/Logout;jsessionid=1234", where 1234 is the session ID.

User Preferences:

In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method, the computer-implemented method comprising:
    under control of a computing device configured with specific computer-executable instructions,
    receiving a first portion of audio data;
    generating, with an automatic speech recognition engine, first transcribed text corresponding to the first portion of the audio data;
    determining a confidence level for transcription accuracy of the first transcribed text;
    transmitting the first transcribed text to a first device for presentation on the first device;
    transmitting the confidence level to the first device, the confidence level associated with a cue for presentation on the first device, wherein the cue indicates the confidence level for transcription accuracy of the first transcribed text, and wherein the cue is distinct from the first transcribed text;
    substantially while the first transcribed text is being presented on the first device,
    receiving a second portion of the audio data; and
    generating, with the automatic speech recognition engine, second transcribed text corresponding to the first portion of the audio data and the second portion of the audio data; and
    transmitting the second transcribed text to the first device for presentation on the first device.

2. The computer-implemented method of claim 1, wherein the confidence level is based at least in part on at least one of:
    a background noise level of the first portion of the audio data; or
    a volume of the first portion of the audio data.

3. The computer-implemented method of claim 1, wherein the confidence level is transmitted to the first device with the first transcribed text.

4. The computer-implemented method of claim 1, wherein:
    the first portion of the audio data and the second portion of the audio data are received as a stream; and
    the second portion of the audio data is received after the first portion of the audio data is received.

5. The computer-implemented method of claim 4, wherein the second portion of the audio data is received substantially immediately after the first portion of the audio data is received.

6. The computer-implemented method of claim 1, wherein the first transcribed text and the second transcribed text each comprise at least one of a syllable, a word, a phrase, or a sentence.

7. A system comprising:
    an electronic data store configured to store one or more algorithms that, when executed, implement an automatic speech recognition engine; and
    a computing device in communication with the electronic data store, the computing device configured to:
    receive a first portion of audio data;
    generate, with the automatic speech recognition engine, first transcribed text corresponding to the first portion of the audio data,
    determine a first confidence level for transcription accuracy of the first transcribed text;
    transmit the first transcribed text to a first device for presentation on the first device;
    transmit the first confidence level to the first device, the first confidence level associated with a cue for presentation on the first device, wherein the cue indicates the first confidence level for transcription accuracy of the first transcribed text, and wherein the cue is distinct from the first transcribed text;
    substantially while the first transcribed text is presented on the first device,
    receive a second portion of the audio data; and
    generate, with the automatic speech recognition engine, second transcribed text corresponding to the first portion of the audio data and the second portion of the audio data; and
    transmit the second transcribed text to the first device for presentation on the first device.

8. The system of claim 7, wherein the first portion of the audio data and the second portion of the audio data are received from the first device.

9. The system of claim 7, wherein the first portion of the audio data and the second portion of the audio data are received from a second device.

10. The system of claim 7, wherein the first transcribed text comprises at least one of a syllable, a word, a phrase, or a sentence.

11. The system of claim 7, wherein the computing device is further configured to:
  generate, with the automatic speech recognition engine, additional first transcribed text corresponding to the first portion of the audio data;
  determine a confidence level for transcription accuracy of the additional first transcribed text; and
  select a portion of the additional first transcribed text with a second confidence level greater than the first confidence level.

12. The system of claim 11, wherein the computing device is further configured to transmit, to the first device, each of the additional first transcribed text.

13. A non-transitory computer-readable storage medium having stored thereon a computer-executable module configured to execute in one or more processors, the computer-executable module being further configured to:
  obtain a first portion of audio data;
  transmit the first portion of the audio data to a remote computing device;
  receive, from the remote computing device, transcribed text corresponding to the first portion of the audio data;
  cause presentation of the transcribed text;
  receive, from the remote computing device, a first confidence level for transcription accuracy of the first transcribed text, the first confidence level associated with a first cue, wherein the first cue indicates the first confidence level for transcription accuracy of the first transcribed text, and wherein the first cue is distinct from the first transcribed text;
  cause presentation of the first cue;
  substantially while the first transcribed text is caused to be presented,
    obtain a second portion of the audio data;
    transmit the second portion of the audio data to the remote computing device; and
    receive, from the remote computing device, second transcribed text corresponding to the first portion of the audio data and the second portion of the audio data; and
  cause presentation of the second transcribed text.

14. The non-transitory computer-readable storage medium of claim 13, wherein the first cue comprises at least one of an auditory cue, a verbal cue, an optical cue, a vibratory cue, or a graphical cue.

15. The non-transitory computer-readable storage medium of claim 13, wherein
  the first cue is presented substantially while the transcribed text is presented.

16. The non-transitory computer-readable storage medium of claim 13, wherein the computer-executable component is further configured to:
  receive, from the remote computing device, a second confidence level corresponding to transcription accuracy of the transcribed text;
  compare the first confidence level to the second confidence level;
  select a second cue based at least in part on the comparison; and
  cause presentation of the second cue.

17. The non-transitory computer-readable storage medium of claim 13, wherein the computer-executable component is further configured to:
  receive, from the remote computing device, one or more alternate transcribed texts corresponding to the first portion of the audio data; and
  cause presentation of the one or more alternate transcribed texts in conjunction with the transcribed text.

18. The non-transitory computer-readable storage medium of claim 13, wherein the computer-executable component is further configured to:
  receive, from the remote computing device, one or more alternate transcribed texts corresponding to the first portion of the audio data and the second portion of the audio data; and
  cause presentation of the one or more alternate transcribed texts in conjunction with the transcribed text.

* * * * *